United States Patent [19]
Kondo et al.

[11] Patent Number: 5,536,425
[45] Date of Patent: * Jul. 16, 1996

[54] PERFLUOROPOLYETHER DERIVATIVES, AND LUBRICANTS AND MAGNETIC RECORDING MEDIUM USING THE SAME

[75] Inventors: Hirofumi Kondo; Toshiharu Uchimi, both of Miyagi, Japan

[73] Assignee: Sony Corporation, Tokyo, Japan

[*] Notice: The term of this patent shall not extend beyond the expiration date of Pat. No. 5,453,539.

[21] Appl. No.: 434,026

[22] Filed: May 3, 1995

Related U.S. Application Data

[63] Continuation of Ser. No. 901,183, Jun. 19, 1992, Pat. No. 5,453,539.

[30]  Foreign Application Priority Data

| Jun. 20, 1991 | [JP] | Japan | 148637 |
| Jul. 8, 1991 | [JP] | Japan | 166640 |
| Aug. 7, 1991 | [JP] | Japan | 198053 |
| Dec. 24, 1991 | [JP] | Japan | 356330 |

[51] Int. Cl.$^6$ .............. C07C 59/115; C10M 105/24; H01F 10/08
[52] U.S. Cl. .................. 252/62.51 R; 252/34; 252/54.6; 252/58; 252/62.55; 252/62.54; 252/62.56; 428/694 TF; 428/694 TB; 562/586; 508/510; 508/517
[58] Field of Search .............. 252/34, 34.7, 51.5 R, 252/54.6, 52 A, 58, 62.51, 62.54, 62.56, 62.55; 562/586, 583, 596; 428/694 ML, 695, 900, 694 SC, 694 R, 694 T, 694 TF, 694 BF

[56]  References Cited

U.S. PATENT DOCUMENTS 5,091,249  2/1992  Nishikawa et al. ............... 428/336
5,091,269  2/1992  Kondo et al. ............... 428/695
5,453,539  9/1995  Kondo et al. ............... 562/586

FOREIGN PATENT DOCUMENTS

| 0382224 | 8/1990 | European Pat. Off. . |
| 0513418 | 11/1992 | European Pat. Off. . |
| 62-288615 | 12/1987 | Japan . |
| 64-8506 | 1/1989 | Japan . |
| 3-252921 | 11/1991 | Japan . |

OTHER PUBLICATIONS

Database WPIL Derwent Publications, Ltd., London GB; AN 89–057007 (08), JP-A-1 008 506 (Sony Corp.) Dec. 1989.

Database WPIL Derwent Publications, Ltd., London GB; AN 89–057715 (08), JP-A-1 009 961 (Sony Corp.), Abstract Jan. 1989.

Database WPIL Derwent Publications, Ltd., London GB; AN 91–374190 (51), JP-A-3 252 921 (Sony Corp.), Abstract Dec. 1991.

Database WPIL Derwent Publications, Ltd., London GB; AN 92–076915, JP-A-4 021 922 (Hitachi KK), Abstract Jan. 1992.

*Primary Examiner*—Prince Willis, Jr.
*Assistant Examiner*—Alan D. Diamond
*Attorney, Agent, or Firm*—Hill, Steadman & Simpson

[57]  ABSTRACT

Novel perfluoropolyether derivatives are described which are obtained from perfluoropolyethers having a carboxyl group at one or both ends and monoamines or diamines. The derivative is useful as a lubricant owing to its significantly improved lubricity. The lubricity is shown under severe high or low temperature and humidity conditions over a long term. The derivative is especially useful as a lubricant for magnetic recording mediums of the coating and metal thin film types.

13 Claims, 2 Drawing Sheets

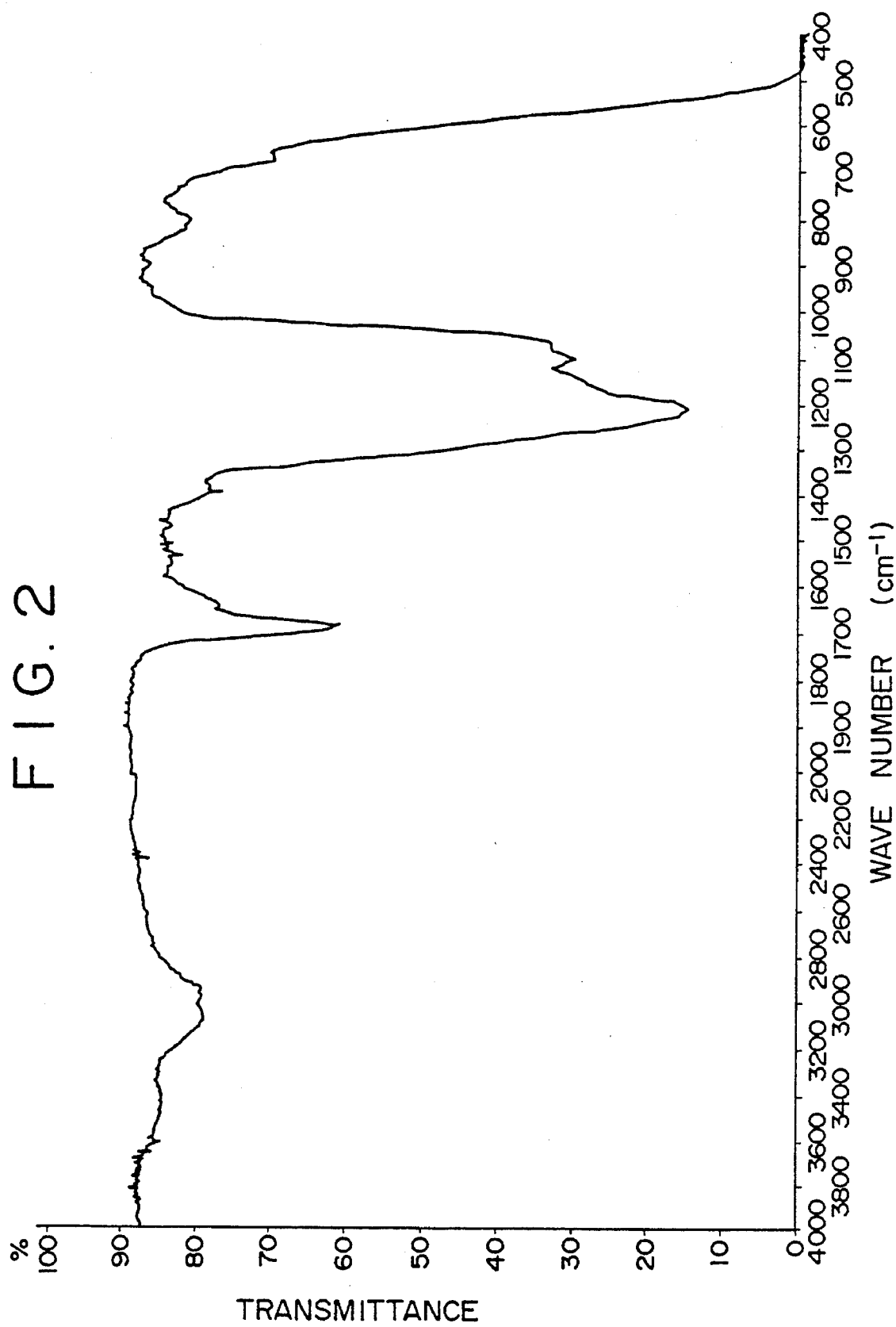

PERFLUOROPOLYETHER DERIVATIVES, AND LUBRICANTS AND MAGNETIC RECORDING MEDIUM USING THE SAME

This is a continuation of application Ser. No. 07/901,183, filed Jun. 19, 1992 now U.S. Pat. No. 5,453,539.

BACKGROUND OF THE INVENTION

1. Field of the Invention

This invention relates to novel perfluoropolyether derivatives. The invention also relates to lubricants and magnetic recording mediums using such derivatives.

2. Description of the Prior Art

Magnetic recording mediums of the type which comprise a non-magnetic support and a magnetic layer formed on the support by vacuum deposition of a ferromagnetic metal have a very good smoothness on the surface of the magnetic layer. This leads to a substantial increase in contact area with a magnetic head and sliding members such as guide rollers, with the attendant problem that the coefficient of friction is increased and the magnetic layer is liable to be sticked over or attached intimately to such members, resulting in poor runnability and durability.

In order to solve the problem, studies have been made on various types of lubricants. Attempts have been heretofore made to coat higher fatty acids or esters thereof on the top of the magnetic layer of the medium so as to decrease the coefficient of friction.

Very severe characteristics have been required for the lubricants which are employed in the magnetic recording medium. Unfortunately, existing lubricants have not cleared up all the requirements.

More particularly, the lubricant which is successfully used in the magnetic recording medium should meet the following requirements.

1) Good low temperature characteristics for ensuring an appreciable effect of lubrication on use in cold districts.

2) Capability of being applied very thinly in view of the spacing from a magnetic head, under which satisfactory lubricating characteristics are shown.

3) Standing repeated use over a long term with a lasting effect of lubrication.

Hitherto employed higher fatty acids and their esters tend to be frozen or solidified under low temperature conditions of not higher than 0° C., thereby impeding the function as a lubricant and also to be short of long-term durability. Instead, there have been studied fluorine-based lubricants such as perfluoropolyethers. The perfluoropolyether is disadvantageous in that it is not dissolved in organic solvents other than freons.

In the field of the magnetic recording medium, practical characteristics such as runnability, durability and the like have been left as unsatisfactory owing to the shortage of the capability of lubricants used.

SUMMARY OF THE INVENTION

It is therefore an object of the invention to provide novel perfluoropolyether derivatives which are useful as a lubricant for magnetic recording mediums.

It is another object of the invention to provide a lubricant which comprises novel perfluoropolyether derivatives and which exhibits good lubricity under various severe use conditions over a long term and is soluble in organic solvents other than freon.

It is a further object of the invention to provide a magnetic recording medium which makes use of such a lubricant as mentioned above and has good runnability, wear resistance and durability significantly improved over those of known counterparts.

The novel perfluoropolyether derivatives are those compounds of the following formulas (1) to (4):

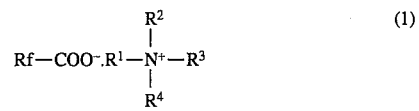

wherein Rf represents a perfluoropolyether chain, and $R^1$, $R^2$, $R^3$, and $R^4$ independently represent a hydrogen atom or a hydrocarbon group having from 6 to 22 carbon atoms;

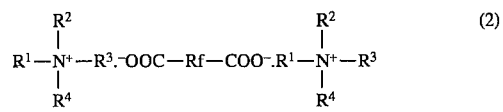

wherein Rf represents a perfluoropolyether chain, and each $R^1$, each $R^2$, each $R^3$, and each $R^4$ independently represent a hydrogen atom or a hydrocarbon group having from 6 to 22 carbon atoms;

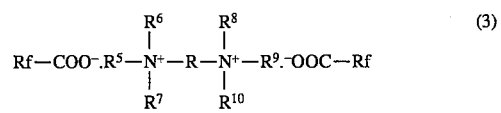

wherein Rf represents a perfluoropolyether chain, R represents an alkylene group having from 2 to 18 carbon atoms or an aromatic group, and $R^5$, $R^6$, $R^7$, $R^8$, $R^9$ and $R^{10}$ independently represent a hydrogen atom or a hydrocarbon group having from 6 to 22 carbon atoms; and

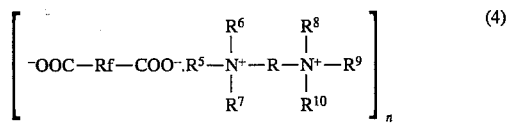

wherein Rf represents a perfluoropolyether chain, R represents an alkylene group having from 2 to 18 carbon atoms or an aromatic group, $R^5$, $R^6$, $R^7$, $R^8$, $R^9$ and $R^{10}$ independently represent a hydrogen atom or a hydrocarbon group having from 6 to 22 carbon atoms, and n is an integer of 1 or over.

The lubricant according to the invention should comprise at least one of the perfluoropolyether derivatives of the formulas (1) to (4).

According to the invention, there is also provided a magnetic recording medium which comprises a non-magnetic support, and a magnetic layer formed on the non-magnetic support. In this type of medium, a perfluoropolyether derivative of the general formula (1), (2), (3) or (4) is contained in the magnetic layer or is formed on the magnetic layer as a top coat. Preferably, the magnetic layer is made of a ferromagnetic metal. In this case, the derivative is formed on the magnetic layer as a top coat.

BRIEF DESCRIPTION OF THE DRAWINGS

FIG. 2 is an IR spectrum chart of a novel perfluoropolyether derivative of the invention obtained from a perfluoropolyether terminated with a carboxyl end group at one end and butyldiamine.

EMBODIMENTS AND DETAILED DESCRIPTION OF THE INVENTION

Figure 1:
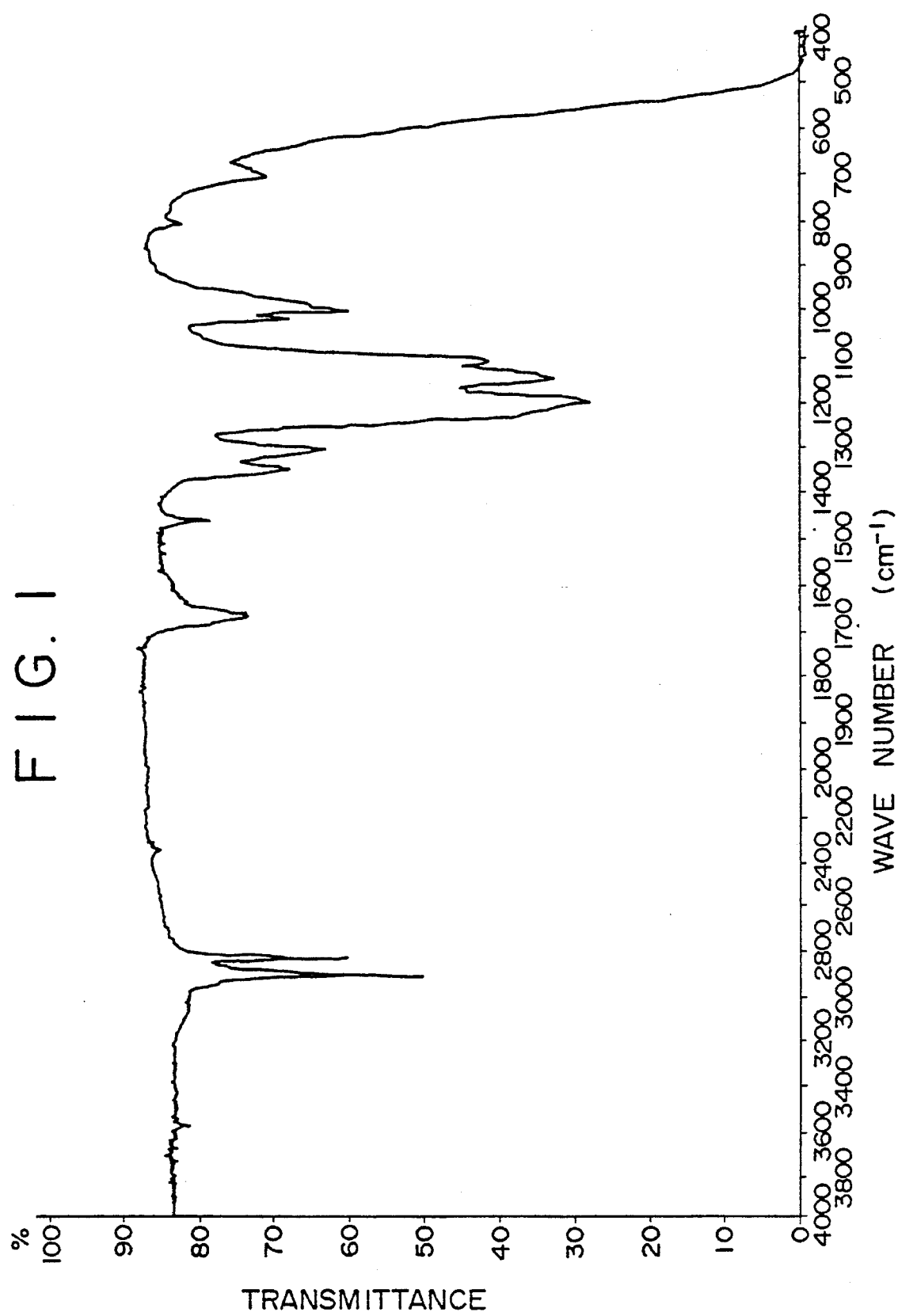
FIG. 1 is an IR spectrum chart of a novel perfluoropolyether derivative of the invention obtained from a perfluoropolyether terminated with a carboxyl group at both ends and stearylamine.

The perfluoropolyether derivatives of the invention are reaction products between perfluoropolyethers having a carboxyl group at one or both ends and amines and also between perfluoropolyethers having a carboxyl group at one or both ends and diamines.

Four types of derivatives have never been known in the art and show significantly better lubricity than known lubricating compounds. In addition, the lubricity is not lowered over a long time. Further, when these compounds are used under low temperature and low humidity conditions or under high temperature and high humidity conditions, good lubricity is ensured. Thus, the derivatives are very useful as a lubricant.

The perfluoropolyether derivatives are first described.

The derivative obtained from a perfluoropolyether having a carboxyl group at one end (which may be hereinafter referred to simply as monofunctional perfluoropolyether) and an amine is of the following general formula (1)

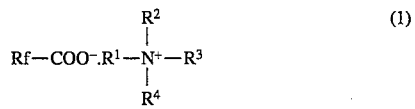

wherein Rf represents a perfluoropolyether chain, and $R^1$, $R^2$, $R^3$, and $R^4$ independently represent a hydrogen atom or a hydrocarbon group having from 6 to 22 carbon atoms.

Likewise, the derivative obtained from a perfluoropolyether having a carboxyl group at both ends (which may be hereinafter referred to simply as polyfunctional perfluoropolyether) and an amine is of the following general formula (2)

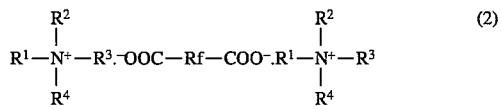

wherein Rf represents a perfluoropolyether chain, and $R^1$'s, $R^2$'s, $R^3$'s and $R^4$'s may be the same or different and represent a hydrogen atom or a hydrocarbon group having from 6 to 22 carbon atoms.

The starting perfluoropolyethers may be ones which are commercially available. Examples of the monofunctional polyether include $F(CF_2CF_2CF_2O)_mCF_2CF_2COOH$, $CF_3[OCF(CF_3)CF_2]_j(OCF_2)_kCOOH$, wherein j and k are, respectively, an integer of 1 or over, and the like. Examples of the polyfunctional perfluoropolyether include $HOOCCF_2(OCF_2CF_2)_p(OCF_2)_qOCF_2COOH$, wherein p and q are, respectively, an integer of 1 or over, and the like. As a matter of course, these examples are shown only for illustration and useful perfluoropolyethers are not limited to those mentioned above.

The molecular weight of the perfluoropolyether is not critical and should preferably be in the range of from 600 to 5000, more preferably from 1000 to 4000. too large a molecular weight of the perfluoropolyether is disadvantageous in that the end group or groups are less effective as an adsorption group. Further, the derivative obtained from such a large molecular weight perfluoropolyether becomes difficult to be dissolved in general-purpose solvents other than freons, e.g. ethanol. On the contrary, when the perfluoropolyether has too small a molecular weight, the lubricity based on the perfluoropolyether chain may be lost.

The amines include primary, secondary and tertiary amines. Quaternary ammonium compound may also be used. The amine structure is not limitative and those amines having a branched structure, an isomeric structure and an alicyclic structure are usable. Also, the amines are not limitative with respect to the molecular weight and the presence or absence of unsaturated bond. Preferably, the amine should have an alkyl group or groups. More preferably, the alkyl group or groups have not less than 10 carbon atoms.

The derivatives may also be obtained from the monofunctional or polyfunctional perfluoropolyether and a diamine. The derivative obtained from a monofunctional perfluoropolyether and a diamine is of the following general formula (3)

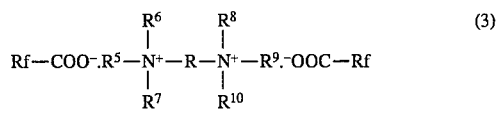

wherein Rf represents a perfluoropolyether chain, R represents an alkylene group having from 2 to 18 carbon atoms or an aromatic group, and $R^5$, $R^6$, $R^7$, $R^8$, $R^9$ and $R^{10}$ independently represent a hydrogen atom or a hydrocarbon group having from 6 to 22 carbon atoms. Further, the derivative obtained from a polyfunctional perfluoropolyether and a diamine is of the following general formula (4)

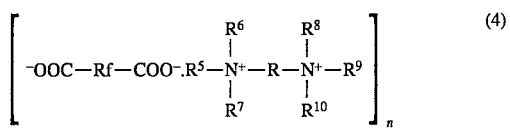

wherein Rf represents a perfluoropolyether chain, R represents an alkylene group having from 2 to 18 carbon atoms or an aromatic group, $R^5$, $R^6$, $R^7$, $R^8$, $R^9$ and $R^{10}$ independently represent a hydrogen atom or a hydrocarbon group having from 8 to 22 carbon atoms, and n is an integer of 1 or over.

The monofunctional and polyfunctional polyethers used in this case may be those set out with respect to the derivatives of the general formulas (1) and (2). Known diamines may be used without limitation, including those diamines having a branched structure, an isomeric structure and an alicyclic structure irrespective of the molecular weight and the presence or absence of unsaturated bond.

Examples of the monoamines and diamines used to prepare the derivatives of the invention include aliphatic amines such as saturated monoamines, saturated diamines, alicyclic monoamines and alicyclic diamines, and aromatic amines.

Specific examples of saturated monoamines include: linear primary amines such as decylamine, undecylamine, dodecylamine, tridecylamine, tetradecylamine, pentadecylamine, hexadecylamine, heptadecylamine, octadecylamine, eicosylamine, docosylamine and the like: branched primary amines such as 2-dodecylamine, 3-dodecylamine, 4-dodecylamine, 5-dodecylamine, 6-dodecylamine, 2-decylamine, 3-decylamine, 4-decylamine, 5-decylamine and the like although not limited to those dodecylamines and decylamines; secondary symmetric amines such as didecylamine, diundecylamine, didodecylamine, ditridecylamine, ditetradecylamine, dipentadecylamine, dihexadecylamine, diheptadecylamine, dioctadecylamine, dieicosylamine, didocosylamine and the like; secondary asymmetric amines having different alkyl chains such as methyldecylamine, methylundecylamine, methyldodecylamine, methyltridecylamine, methyltetradecylamine, methylpnetadecylamine, methylhexadecylamine, methylheptadecylamine, methyloctadecylamine, methyleicosylamine, methyldocosylamine, ethyldecylamine, ethylundecylamine, ethyldodecylamine, ethyltridecylamine, ethyltetradecylamine, ethylpentadecylamine, ethylhexadecylamine, ethylheptadecylamine, ethyloctadecylamine, ethyleicosylamine, ethyldocosylamine, butyldecylamine, butylundecylamine, butyldodecylamine, butyltridecylamine, butyltetradecylamine, butylpentadecylamine, butylhexadecylamine, butylheptadecylamine, butyloctadecylamine, butyleicosylamine, butyldocosylamine and the like; and tertiary amines having three alkyl chains which may be the same or different provided that at least one long-chain alkyl group, e.g. symmetric amines such as tridecylamine, triundecylamine, tridodecylamine, tritridecylamine, tritetradecylamine, tripentadecylamine, trihexadecylamine, triheptadecylamine, trioctadecylamine, trieicosylamine, tridocosylamine and the like, and asymmetric amines such as dimethyldecylamine, dimethylundecylamine, dimethyldodecylamine, dimethyltridecylamine, dimethyltetradecylamine, dimethylpentadecylamine, dimethylhexadecylamine, dimethylheptadecylamine, dimethyloctadecylamine, dimethyleicosylamine, dimethyldocosylamine, butylmethyldecylamine, butylmethylundecylamine, butylmethyldodecylamine, butylmethyltridecylamine, butylmethyltetradecylamine, butylmethylpentadecylamine, butylmethylhexadecylamine, butylmethylheptadecylamine, butylmethyloctadecylamine, butylmethyleicosylamine, butylmethyldocosylamine, methyldidecylamine, methyldiundecylamine, methyldidodecylamine, methylditridecylamine, methylditetradecylamine, methyldipentadecylamine, methyldihexadecylamine, methyldiheptadecylamine, methyldioctadecylamine, methyldieicosylamine, methyldidocosylamine and the like.

Specific examples of the saturated diamines include: symmetric primary diamines such as ethylenediamine, propylenediamine, tetramethylenediamine, pentamethylenediamine, hexamethylenediamine, heptamethylenediamine, octamethylenediamine, nonamethylenediamine, decamethylenediamine, undecamethylenediamine, dodecamethylenediamine, tridecamethylenediamine, tetradecamethylenediamine, pentadecamethylenediamine, hexadecamethylenediamine, heptadecamethylenediamine, octadecamethylenediamine and the like; primary asymmetric diamines such as 1,2-dodecamethylenediamine, 1,3-dodecamethylenediamine, 1,4-dodecamethylenediamine, 1,5-dodecamethylenediamine, 1,6-dodecamethylenediamine, 1,7-dodecamethylenediamine, 2,3-dodecamethylenediamine, 2,4-dodecamethylenediamine, 2,5-dodecamethylenediamine, 2,6-dodecamethylenediamine, 2,7-dodecamethylenediamine, 2,8-dodecamethylenediamine, 2,9-dodecamethylenediamine, 3,4-dodecamethylenediamine, 3,5-dodecamethylenediamine, 3,6-dodecamethylenediamine, 3,7-dodecamethylenediamine, 3,8-dodecamethylenediamine, 4,5-dodecamethylenediamine, 4,6-dodecamethylenediamine, 4,7-dodecamethylenediamine, 5,6-dodecamethylenediamine and the like, and other higher alkylmethylenediamines being likewise usable; symmetric and asymmetric secondary diamines including those secondary diamines wherein one of the amine groups is in the form of a secondary amine, e.g. N,N'-dimethylethylenediamine, N,N'-dimethylpropylenediamine, N,N'-dimethyltetramethylenediamine, N,N'-dimethylpentamethylenediamine, N,N'-dimethylhexamethylenediamine, N,N'-dimethylheptamethylenediamine, N,N'-dimethyloctamethylenediamine, N,N'-dimethylundecamethylenediamine, N,N'-dimethyldodecamethylenediamine, N,N'-dimethyltridecamethylenediamine, N,N'-dimethyltetradecamethylenediamine, N,N'-dimethylpentadecamethylenediamine, N,N'-dimethylhexadecamethylenediamine, N,N'-dimethylheptadecamethylenediamine, N,N'-dimethyloctadecamethylenediamine and the like; tertiary diamines including symmetric tertiary diamines and tertiary diamines having different alkyl groups, e.g. diamines having a terminal amino group such as N,N,N',N'-tetramethylethylenediamine, N,N,N',N'-tetramethylpropylenediamine, N,N,N',N'-tetramethyltetramethylenediamine, N,N,N',N'-tetramethylpentamethylenediamine, N,N,N',N'-tetramethylhexamethylenediamine, N,N,N',N'-tetramethylheptamethylenediamine, N,N,N',N'-tetramethyloctamethylenediamine, N,N,N',N'-tetramethylnonamethylenediamine, N,N,N',N'-tetramethyldecamethylenediamine, N,N,N',N'-tetramethylundecamethylenediamine, N,N,N',N'-tetramethyldodecamethylenediamine, N,N,N',N'-tetramethyltridecamethylenediamine, N,N,N',N'-tetramethyltetradecamethylenediamine, N,N,N',N'-tetramethylpentadecamethylenediamine, N,N,N',N'-tetramethylhexadecamethylenediamine, N,N,N',N'-tetramethylheptadecamethylenediamine, N,N,N',N'-tetramethyloctadecamethylenediamine, and the like although diamines substituted with an amino group at asymmetric positions may also be used.

Specific examples of the alicylic amines wherein an amino group is substituted at an alicyclic structure include alicyclic primary amines such as cyclopropylamine, cyclobutylamine, cyclopentylamine, cyclohexylamine, cyclooctylamine and the like, alicyclic secondary amines such as N-methylcyclopropylamine, N-methylcyclobutylamine, N-methylcyclopentylamine, N-methylcyclohexylamine, N-methylcyclooctylamine and the like, and alicyclic tertiary amines such as N,N-dimethylcyclopropylamine, N,N-dimethylcyclobutylamine, N,N-dimethylcyclopentylamine, N,N-dimethylcyclohexylamine, N,N-dimethylcyclooctylamine and the like. The type of substituted alkyl group is limited to the methyl group above and may be selected within a defined number of carbon atoms hereinbefore.

Specific examples of the alicyclic diamines include alicyclic primary diamines such as cyclopropyldiamine, cyclobutyldiamine, cyclopentyldiamine, cyclohexyldiamine, cyclooctyldiamine and the like, alicyclic secondary diamines such as N-methylcyclopropyldiamine, N-methylcyclobutyldiamine, N-methylcyclopentyldiamine, N-methylcyclohexyldiamine, N-methylcyclooctyldiamine and the like, and alicyclic tertiary diamines such as N,N-dimethylcyclopropyldiamine, N,N-dimethylcyclobutyldiamine, N,N-dimethylcyclopentyldiamine, N,N-dimethylcyclohexyldiamine, N,N-dimethylcyclooctyldiamine and the like.

Specific examples of the aromatic amines include alkylanilines such as N-methylaniline, N-ethylaniline, N-propylaniline, N-decylaniline, N-dodecylaniline, N-tetradecylaniline, N-hexadecylaniline, N-octadecylaniline and the like, symmetric tertiary anilines such as N,N-dimethylaniline, N,N-diethylaniline, N,N-dipropylaniline, N,N-didecylaniline, N,N-didodecylaniline, N,N-ditetradecylaniline, N,N-dioctadecylaniline and the like, and asymmetric tertiary amines such as ethylmethylaniline, propylmethylaniline, decylmethylaniline, dodecylmethylaniline, tetradecylmethylaniline, hexadecylmethylaniline, octadecylmethylaniline and the like. In addition, the alkyl moiety may be substituted and examples of such aniline derivatives include N-2- chloroethylaniline, N-2-bromoethylaniline, N-2-oxyethylaniline, N,N-2-dichloroethylaniline and the like.

Moreover, derivatives of the aromatic diamines may be used including, for example, o-phenylenediamine, p-phenylenediamine, m-phenylenediamine and the like. Further, monoalkyl derivatives of the aromatic diamines may also be used including, for example, N-methylphenylenediamine, N-butylphenylenediamine, N-decylphenylenediamine, N-tetradecylphenylenediamine, N-octadecylphenylene diamine and the like. Examples of dialkyl derivatives include N,N-dimethylphenylenediamine, N,N-ethylphenylenediamine, N,N-decylphenylenediamine, N,N-tetradecylphenylenediamine, N,N-hexadecylphenylenediamine, N,N-octadecylphenylenediamine and the like.

Although the aromatic amines which have been illustrated above are those which have a benzene ring, other amine compounds having condensation-type polycyclic hydrocarbon structures which are substituted with an amino group or groups may also be used. Such structures include, for example, pentalene, pyrene, indene, chrysene, naphthalene, naphthacene, azulene, heptalene, biphenylene, indacene, acenaphthylene, fluorene, phenalene, phenanthrene, anthracene, fluoranthene, acephenanthrene, aceanthrylene, triphenylene, pleiadene, picene, perylene, pentaphene, pentacene, tetraphenylene, hexaphene, hexacene, rubicene, coronene, trinaphthylene, heptaphene, heptacene, pyreanthrene, ovalene and the like.

Aside from the hydrocarbons, there may be used amines having heterocyclic structures having a hereto atom in the molecule. For instance, those compounds having heterocyclic structures substituted with an amino group or groups may be used and examples of such heterocyclic structures include furan, thiophene, pyrrole, pyrroline, oxazole, iso-oxazole, thiazole, iso-thiazole, imidazole, imidazoline, imadazolidine, pyrazole, pyrazoline, pyrazolidine, furazane, pyran, pyridine, piperidine, pyridazine, pyrimidine, pyrazine, piperazine, morpholine, indole, indoline, indazole, chromene, chroman, iso-chroman, quinoline, iso-quinoline, cinnoline, phthalazine, quinazoline, quinoxaline, naphthyridine, purine, pteridine, indolizine, carbazole, acridine, phenazine, phenanthridine, phenanthroline, xanthene, phenoxazine, thianthrene, quinucsalizine, and the like.

The monoamines and diamines set out above are described only as typical examples, and substituted alkyl group or groups may be all alkyl group or groups defined in the formulas (1) to (4) with respect to the number of carbon atoms. In addition, the positions of substituents are not limited to those set forth above and substituents may be located at positions other than those particularly set out hereinabove.

The perfluoropolyether derivatives of the invention may be those wherein the perfluoropolyether chain is partially hydrogenated. More particularly, not larger than 50% of the fluorine atoms of the perfluoropolyether chain may be substituted with a hydrogen atom. For the preparation, a partially hydrogenated perfluoropolyether which is either monofunctional or polyfunctional in nature is used as the starting perfluoropolyether. By this, it becomes possible to reduce the amount of freon solvents for dissolution. A typical example of a partially hydrogenated perfluoropolyether is shown below, but not limitative

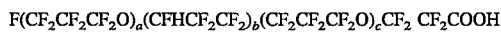

$F(CF_2CF_2CF_2O)_a(CFHCF_2CF_2)_b(CF_2CF_2CF_2O)_cCF_2CF_2COOH$ wherein a, b and c are, respectively, an integer of 1 or over.

The novel perfluoropolyether derivatives can be simply prepared from perfluoropolyethers and amines or diamines according to the following procedure.

A monofunctional or polyfunctional perfluoropolyether and an amine or diamine are mixed and heated to a temperature higher than a melting point of the amine or diamine used, thereby obtaining an intended derivative. For instance, when stearylamine is used as the amine, it is sufficient to mix and heat the starting compounds at about 60° C.

Alternatively, the starting materials may be dissolved in organic solvents such as Freon, after which the solvent is removed, thereby obtaining an intended derivative. Where a quaternary ammonium compound is used as the amine, a metal salt of a perfluoropolyether such as a sodium salt and a quaternary ammonium salt is mixed and extracted with an organic solvent to obtain an intended derivative. The quaternary ammonium salts may be chlorides, iodides, sulfates and the like.

The perfluoropolyether derivatives have good lubricity and can be utilized as a lubricant in wide fields. Especially, when the derivative is used as a lubrication for magnetic recording mediums, runnability, wear resistance and durability can be significantly improved, coupled with another advantage from the standpoint of fabrication of the medium that the derivative is dissolved in solvents other than freon, e.g. ethanol.

The perfluoropolyether derivatives may be used singly as a lubricant and may also be used in combination with other known lubricants.

The magnetic recording medium using the derivative lubricant is described. The magnetic recording medium to which the invention is directed may be of the coating type which comprises a non-magnetic support and a magnetic layer formed on the support using a magnetic pain. In this type of medium, the non-magnetic support, and the magnetic powder and the resin binder used in the magnetic layer may be, respectively, made of materials ordinarily employed for this purpose.

Examples of such non-magnetic supports include polymer supports made of plastic materials typical of which are polyesters, polyolefins, cellulose derivatives, vinyl resins, polyimide resins, polyamide resins, polycarbonate resins and the like, metallic substrates or sheets such as of aluminium alloys, titanium alloys and the like, ceramic and glass substrates such as alumina glass, and the like. The support is not limitative with respect to the shape thereof and may be in the form of tapes, sheets, drums and the like. The non-magnetic support may be formed with fine irregularities on the surfaces thereof in order to control surface properties.

Examples of the magnetic powder include particles of ferromagnetic iron oxides such as $\tau$-$Fe_2O_3$, cobalt-deposited $\tau$-$Fe_2O_3$ and the like, ferromagnetic chromium dioxide, ferromagnetic metals, such as Fe, Co, Ni and the like, and alloys thereof, and fine particles of hexagonal ferrites.

The resin binders include polymers or copolymers of vinyl chloride, vinyl acetate, vinyl alcohol, vinylidene chloride, acrylic esters, methacrylic esters, styrene, butadiene, acrylonitrile and the like, polyurethane resins, epoxy resins, cellulose derivatives and the like. In order to improve the dispersability of the magnetic powder, the resin binders may be introduced with hydrophilic polar groups such as a carboxyl group, a sulfonate group, a sulfate group, a phosphate group or the like.

In order to apply the perfluoropolyether derivative of the invention to the coating-type medium, the derivative may be added to the magnetic layer or may be coated as a top coat on the surface of the magnetic layer. Alternatively, both the addition to the magnetic layer and the top coating may be used in combination.

The amount of the perfluoropolyether derivative is not critical. When internally added to the magnetic layer, the derivative is preferably used in an amount of from 0.2 to 20 parts by weight per 100 parts by weight of the resin binder. When applied as a top coat on the layer surface, it is preferred to apply the derivative in an amount of from 0.5 to 100 mg/m$^2$, more preferably from 1 to 20 mg/m$^2$.

The derivative may be further applied, as a lubricant, to a metallic thin film-type magnetic recording medium wherein a continuous film of a ferromagnetic metal is formed as a magnetic layer on a non-magnetic support such as by sputtering. The film structure of this type of medium is not limitative. For instance, the derivative may be applied to a magnetic recording medium of the type wherein an undercoat is provided between the non-magnetic support and the magnetic layer or wherein a back coat layer is formed on a side of the support opposite to the magnetic layer.

The materials of the non-magnetic support and the metal magnetic thin film of this type of medium are not critical and hitherto known materials ordinarily used for this purpose may be used in the practice of the invention.

Examples of the non-magnetic support may be those as used in the coating-type magnetic recording medium. When a rigid substrate such as an Al alloy substrate or a glass sheet, the substrate may be subjected to alumite treatment to form an oxide film on the substrate surfaces or may be formed with a Ni-P film on the surfaces so as to harden the surface.

The metal magnetic thin film is formed as a continuous film by plating, sputtering or PVD techniques such as vacuum deposition. Examples of such a thin film include metal magnetic films for in-plane magnetization recording which are made of metals such as Fe, Co, NI and the like, Co-pt alloys, Co-Pt-Ni alloys, Fe-Co alloys, Fe-Ni alloys, Fe-Co-Ni alloys, Fe-Ni-B alloys, Fe-Co-B alloys, Fe-Co-i-B alloys and the like, and Co-C alloy films.

Especially, with the metal magnetic thin films for in-plane magnetization recording, it is preferred that an undercoat layer of a low melting non-magnetic material such as Bi, Sb, Pb, Sn, Ga, In, Ge, Si, Ti or the like is preliminarily formed on the non-magnetic support. Subsequently, a metal magnetic material is vacuum deposited or sputtered from a vertical direction so that the low melting non-magnetic material is caused to be diffused into the magnetic thin film. As a result, the thin film is prevented from orientation to ensure the in-plane isotropy and also to improve the coercive force.

If a hard disk is fabricated, the metal magnetic thin film may be formed on the surface thereof a hard protective film such as a carbon film, a diamond-like or amorphous carbon film, a chromium oxide film or a SiO$_2$ film.

For application of the perfluoropolyether derivative to the metal thin film-type magnetic recording medium, the derivative layer is formed as a top cost on the surface of the magnetic thin film or the protective film. The amount of the perfluoropolyether derivative is preferably in the range of from 0.5 to 100 mg/m$^2$, more preferably from 1 to 20 mg/m$^2$.

In either a coating-type or a metal thin film-type of magnetic recording medium, the perfluoropolyether derivatives may be used singly as the lubricant for the medium or in combination with other known lubricants.

In order to ensure a lasting lubricity under severer conditions, the derivative may be used in combination with an extreme pressure agent at a mixing ratio by weight of 30:70 to 70:30.

When the extreme pressure agent is subjected to partial metallic contact in a boundary lubricating region, it reacts with the metallic surface owing to the heat of friction produced by the contact, so that a film of the reaction product is formed, thereby serving to mitigate the abrasion and wear of the metal. Examples of the agent include phosphorus extreme pressure agents, sulfur extreme pressure agents, halogen extreme pressure agents, organometallic extreme pressure agents, composite extreme pressure agents and the like.

Aside from the derivatives, lubricants and extreme pressure agents, rust preventives may be added, if necessary.

Rust preventives may be ones which are ordinarily employed in these types of magnetic recording mediums and include, for example, phenols, naphthols, quinones, nitrogen-containing heterocyclic compounds, oxygen-containing heterocylic compounds, sulfur-containing heterocyclic compounds and the like.

When the magnetic recording medium has a back coat layer, the perfluoropolyether derivative may be internally added to or applied as a top coat onto the back coat layer as a lubricant. As a matter of course, the derivatives may be internally added to or applied as a top coat onto all or either of the magnetic coating layer or the metal magnetic thin film and the back coat layer in possible combinations.

Moreover, when the perfluoropolyether derivative is used as a lubricant, the derivative which has been prepared according to the procedure stated hereinbefore may not necessarily be used. More particularly, a starting perfluoropolyether and a starting amine or diamine may be mixed and used as a lubricant. By the mixing, the perfluoropolyether derivative is produced and exhibits lubricity.

In this case, the mixing ratio between the perfluoropolyether and the amine or diamine may be set at an equimolar ratio with respect to the carboxyl group and the amino group. For use as the lubricant of the magnetic recording medium, good lubricity is developed when the amine is used slightly in excess. This is considered for the following reason: when the mixture is applied onto a magnetic layer, the perfluoropolyether which exhibits acidity owing to its carboxyl groups is preferentially adsorbed on the surface of the basic ferromagnetic metallic thin film (magnetic layer), thus leading to the shortage of the amine.

Accordingly, when used as a lubricant of the magnetic recording medium, the mixture should has a ratio by mole between the amino group and the carboxyl group in the range of 3:7 to 40:1.

The amine salts or derivatives of perfluoropolyethers having a carboxyl group at one or both ends thereof exhibit good lubricity and can reduced a coefficient of friction. The lubricity is scarcely impeded under severe conditions such as of low temperatures. When using the derivative as the lubricant, the magnetic recording medium is significantly improved in runnability and durability.

The present invention is more particularly described by way of examples, which should not be construed as limitation of the invention.

Preparation of Perfluoropolyether Amine Salts 20 g of a perfluoropolyether having a carboxyl group at one end and represented by the formula, [F(CF$_2$CF$_2$CF$_2$O)$_m$CF$_2$CF$_2$COOH], (molecular weight: 1700) was placed in a round bottom flask, to which 3.2 g of octadecylamine was added.

Subsequently, the mixture was heated to 60° C. and dissolved and was sufficiently agitated to obtain s uniform mixture, followed by cooling to obtain an amine salt of the perfluoropolyether.

The IR absorption spectra of the thus obtained amine salt are shown in FIG. 1. From FIG. 1, it will be seen that the stretching vibration of NH at 3300 cm$^{-1}$ disappears and the absorption of the carbonyl at 1780 cm$^{-1}$ is shifted to 1670 cm$^{-1}$. There appear the stretching vibrations of CH at 2900 cm$^{-1}$ and 2825 cm$^{-1}$ and the stretching vibration of CF at from 1280 cm$^{-1}$ to 1060 cm$^{-1}$. From these facts, the structure of the resultant amine salt can be determined.

In the same manner as described above, there were prepared a number of amine salts of perfluoropolyethers having a carboxyl group at one and both ends. These salts are shown in Table 1 below.

cant and a tape which made use of only a perfluoropolyether terminated with a carboxyl group as a lubricant were also subjected to measurements. The results are shown in Tables 2 to 4.

TABLE 1

| Product No. | Perfluoropolyether | $R^2$ | $R^3$ | $R^1$ |
|---|---|---|---|---|
| 1 | $F(CF_2CF_2CF_2O)_mCF_2CF_2COOH$ | H | $CH_3$ | $C_{18}H_{37}$ |
| 2 | $F(CF_2CF_2CF_2O)_mCF_2CF_2COOH$ | H | H | $C_{16}H_{33}$ |
| 3 | $F(CF_2CF_2CF_2O)_mCF_2CF_2COOH$ | H | H | $C_{14}H_{29}$ |
| 4 | $F(CF_2CF_2CF_2O)_mCF_2CF_2COOH$ | H | H | $C_{12}H_{25}$ |
| 5 | $F(CF_2CF_2CF_2O)_mCF_2CF_2COOH$ | H | $C_{12}H_{25}$ | $C_{12}H_{25}$ |
| 6 | $F(CF_2CF_2CF_2O)_mCF_2CF_2COOH$ | $C_{12}H_{25}$ | $C_{12}H_{25}$ | $C_{12}H_{25}$ |
| 7 | $F(CF_2CF_2CF_2O)_mCF_2CF_2COOH$ | $CH_3$ | $CH_3$ | $CH_2=CHC_{16}H_{32}$ |
| 8 | $F(CF_2CF_2CF_2O)_mCF_2CF_2COOH$ | $CH_3$ | $CH_3$ | $C_6H_5$ (phenyl) |
| 9 | $CF_3(OCFCF_2)_j(OCF_2)_kCOOH$ with $CF_3$ branch | H | $CH_3$ | $C_{18}H_{37}$ |
| 10 | $CF_3(OCFCF_2)_j(OCF_2)_kCOOH$ with $CF_3$ branch | H | H | $C_{12}H_{25}$ |
| 11 | $CF_3(OCFCF_2)_j(OCF_2)_kCOOH$ with $CF_3$ branch | H | $C_{18}H_{37}$ | $C_{18}H_{37}$ |
| 12 | $HOOCCF_2(OC_2H_4)_p(OCF_2)_qOCF_2COOH$ | H | $CH_3$ | $C_{18}H_{37}$ |
| 13 | $HOOCCF_2(OC_2H_4)_p(OCF_2)_qOCF_2COOH$ | H | $C_{12}H_{25}$ | $C_{12}H_{25}$ |
| 14 | $HOOCCF_2(OC_2H_4)_p(OCF_2)_qOCF_2COOH$ | H | $C_{18}H_{37}$ | $C_{18}H_{37}$ |

EXAMPLE 1

This example illustrates application to a metal thin film-type magnetic recording medium (vacuum deposited tape). The product 1 in Table 1 was used to make the magnetic recording medium.

Co was deposited on a 14 μm thick polyethylene terephthalate film by an oblique vacuum deposition method form a 200 nm thick ferromagnetic metal thin film. Subsequently, the product 1 of Table 1 was dissolved in a freon solvent and applied onto the surface of the thin film in an amount of 5 mg/m$^2$, followed by cutting into 8 mm wide sample tapes.

EXAMPLES 2 TO 14

The general procedure of Example 1 was repeated using Product Nos. 2 to 14 instead of Product No. 1 in Table 1, thereby obtaining sample tapes.

The respective sample tapes were subjected to measurement of a coefficient of friction, still reproduction durability and shuttle durability under conditions of a temperature of 25° C. and a relative humidity of 60%, a temperature of −5° C., and a temperature of 40° C. and a relative humidity of 80%.

The still reproduction durability was evaluated as an attenuation time before the output was attenuated to −3 dB under posing conditions. The shuttle durability was evaluated as the number of shuttle cycles which were determined by subjecting the tape to a shuttle running of two minutes in one cycle until the output was lowered to 3 dB. For comparison, a blank tape which made no use of any lubri-

TABLE 2

| | Conditions | Coefficient Of Friction | Still Reproduction Durability (minutes) | Shuttle Durability (Cycles) |
|---|---|---|---|---|
| Ex. 1 | 25° C., 60% R.H. | 0.17 | >120 | >150 |
| | 40° C., 80% R.H. | 0.20 | >120 | >150 |
| | −5° C. | 0.16 | >120 | >150 |
| Ex. 2 | 25° C., 60% R.H. | 0.16 | >120 | >150 |
| | 40° C., 80% R.H. | 0.21 | >120 | >150 |
| | −5° C. | 0.17 | >120 | >150 |
| Ex. 3 | 25° C., 60% R.H. | 0.17 | >120 | >150 |
| | 40° C., 80% R.H. | 0.19 | >120 | >150 |
| | −5° C. | 0.16 | >120 | >150 |
| Ex. 4 | 25° C., 60% R.H. | 0.15 | >120 | >150 |
| | 40° C., 80% R.H. | 0.20 | >120 | >150 |
| | −5° C. | 0.16 | >120 | >150 |
| Ex. 5 | 25° C., 60% R.H. | 0.17 | >120 | >150 |
| | 40° C., 80% R.H. | 0.19 | >120 | >150 |
| | −5° C. | 0.17 | >120 | >150 |
| Ex. 6 | 25° C., 60% R.H. | 0.17 | >120 | >150 |
| | 40° C., 80% R.H. | 0.21 | >120 | >150 |
| | −5° C. | 0.18 | >120 | >150 |

TABLE 3

| | Conditions | Coefficient Of Friction | Still Reproduction Durability (minutes) | Shuttle Durability (Cycles) |
|---|---|---|---|---|
| Ex. 7 | 25° C., 60% R.H. | 0.18 | >120 | >150 |
| | 40° C., 80% R.H. | 0.22 | >120 | >150 |

TABLE 3-continued

| | Conditions | Coefficient Of Friction | Still Reproduction Durability (minutes) | Shuttle Durability (Cycles) |
|---|---|---|---|---|
| | −5° C. | 0.19 | >120 | >150 |
| Ex. 8 | 25° C., 60% R.H. | 0.18 | >120 | >150 |
| | 40° C., 80% R.H. | 0.22 | >120 | >150 |
| | −5° C. | 0.20 | >120 | >150 |
| Ex. 9 | 25° C., 60% R.H. | 0.18 | >120 | >150 |
| | 40° C., 80% R.H. | 0.23 | >120 | >150 |
| | −5° C. | 0.17 | >120 | >150 |
| Ex. 10 | 25° C., 60% R.H. | 0.17 | >120 | >150 |
| | 40° C., 80% R.H. | 0.21 | >120 | >150 |
| | −5° C. | 0.18 | >120 | >150 |
| Ex. 11 | 25° C., 60% R.H. | 0.17 | >120 | >150 |
| | 40° C., 80% R.H. | 0.19 | >120 | >150 |
| | −5° C. | 0.16 | >120 | >150 |
| Ex. 12 | 25° C., 60% R.H. | 0.17 | >120 | >150 |
| | 40° C., 80% R.H. | 0.20 | >120 | >150 |
| | −5° C. | 0.18 | >120 | >150 |

TABLE 4

| | Conditions | Coefficient Of Friction | Still Reproduction Durability (minutes) | Shuttle Durability (Cycles) |
|---|---|---|---|---|
| Ex. 13 | 25° C., 60% R.H. | 0.15 | >120 | >150 |
| | 40° C., 80% R.H. | 0.21 | >120 | >150 |
| | −5° C. | 0.17 | >120 | >150 |
| Ex. 14 | 25° C., 60% R.H. | 0.16 | >120 | >150 |
| | 40° C., 80% R.H. | 0.20 | >120 | >150 |
| | −5° C. | 0.18 | >120 | >150 |
| Comp. Ex. 1 | 25° C., 60% R.H. | 0.9 | 2 | 3 |
| | 40° C., 80% R.H. | — | — | — |
| | −5° C. | — | — | — |
| Comp. Ex. 2 | 25° C., 60% R.H. | 0.28 | >120 | >150 |
| | 40° C., 80% R.H. | 0.38 | 91 | 55 |
| | −5° C. | 0.31 | 51 | 60 |
| Comp. Ex. 3 | 25° C., 60% R.H. | 0.31 | 95 | 120 |
| | 40° C., 80% R.H. | 0.43 | 76 | 46 |
| | −5° C. | 0.32 | 29 | 40 |
| Comp. Ex. 4 | 25° C., 60% R.H. | 0.31 | 100 | 89 |
| | 40° C., 80% R.H. | 0.42 | 82 | 40 |
| | −5° C. | 0.30 | 45 | 55 |

As will be apparent from the results of Tables 2 to 4, the prepared amine salts are better than in the case of the single use of the perfluoropolyether terminated with the carboxyl group with respect to the coefficient of friction, the still reproduction durability and the shuttle durability. In addition, very good results are obtained with the characteristics suffering little degradation under various conditions. Although the durabilities were also measured using ethanol instead of Freon, similar results were obtained.

EXAMPLE 15

This example illustrates application to a coating-type magnetic recording medium.

| | |
|---|---|
| Metallic magnetic powder | 100 parts by weight |
| Vinyl chloride-vinyl acetate copolymer | 10.5 parts by weight |
| Polyurethane resin | 10.5 parts by weight |
| Carbon (antistatic agent) | 5 parts by weight |
| Methyl ethyl ketone | 150 parts by weight |
| Methyl isobutyl ketone | 150 parts by weight |

A fundamental composition of the above formulation provided, to which 1.5 parts by weight of Product No. 1 in Table 1 was added as a lubricant, followed by mixing in a ball mill for 24 hours and collection through a filter. 4 parts by weight of a curing agent was added to the mixture, followed by agitation for 30 minutes. The resultant magnetic paint was applied onto a 12 μm thick polyethylene terephthalate base in a dry thickness of 5 μm, followed by magnetic orientation, drying and taking-up. The rolled film was calendered and cut into ½ inch wide sample tapes.

EXAMPLES 16 TO 28

The general procedure of Example 15 was repeated except that Product Nos. 2 to 14 were used instead of Product No. 1, thereby obtaining sample tapes.

The sample tapes were aged under conditions of a temperature of 25° C. and a relative humidity of 60% and a temperature of 40° C. and a relative humidity of 80% and subjected to measurements of a coefficient of friction and a stick-slip prior to and after the aging. The results are shown in Tables 5 and 6. the surface roughness was also determined since the roughness was considered as an index of a dispersion state, with results also shown in the tables.

TABLE 5

| | | Prior To Aging | | After Aging | |
|---|---|---|---|---|---|
| | Conditions | Coefficient of Friction | Stick-slip | Coefficient Of Friction | Stick-slip |
| Ex. 15 | 25° C., 60% R.H. | 0.27 | O | 0.28 | O |
| | 40° C., 80% R.H. | 0.29 | O | 0.31 | O |
| Ex. 16 | 25° C., 60% R.H. | 0.26 | O | 0.27 | O |
| | 40° C., 80% R.H. | 0.31 | O | 0.32 | O |
| Ex. 17 | 25° C., 60% R.H. | 0.26 | O | 0.28 | O |
| | 40° C., 80% R.H. | 0.28 | O | 0.33 | O |
| Ex. 18 | 25° C., 60% R.H. | 0.28 | O | 0.29 | O |
| | 40° C., 80% R.H. | 0.31 | O | 0.33 | O |
| Ex. 19 | 25° C., 60% R.H. | 0.29 | O | 0.32 | O |
| | 40° C., 80% R.H. | 0.33 | O | 0.34 | O |
| Ex. 20 | 25° C., 60% R.H. | 0.29 | O | 0.30 | O |
| | 40° C., 80% R.H. | 0.31 | O | 0.33 | O |
| Ex. 21 | 25° C., 60% R.H. | 0.30 | O | 0.31 | O |
| | 40° C., 80% R.H. | 0.33 | O | 0.34 | O |

TABLE 6

| | | Prior To Aging | | After Aging | |
|---|---|---|---|---|---|
| | Conditions | Coefficient of Friction | Stick-slip | Coefficient Of Friction | Stick-slip |
| Ex. 22 | 25° C., 60% R.H. | 0.31 | O | 0.33 | O |
| | 40° C., 80% R.H. | 0.33 | O | 0.34 | O |
| Ex. 23 | 25° C., 60% R.H. | 0.28 | O | 0.30 | O |
| | 40° C., 80% R.H. | 0.30 | O | 0.33 | O |
| Ex. 24 | 25° C., 60% R.H. | 0.25 | O | 0.26 | O |
| | 40° C., 80% R.H. | 0.26 | O | 0.28 | O |
| Ex. 25 | 25° C., 60% R.H. | 0.26 | O | 0.27 | O |
| | 40° C., 80% R.H. | 0.27 | O | 0.29 | O |
| Ex. 26 | 25° C., 60% R.H. | 0.28 | O | 0.29 | O |
| | 40° C., 80% R.H. | 0.32 | O | 0.33 | O |
| Ex. 27 | 25° C., 60% R.H. | 0.26 | O | 0.28 | O |
| | 40° C., 80% R.H. | 0.29 | O | 0.30 | O |
| Ex. 28 | 25° C., 60% R.H. | 0.26 | O | 0.26 | O |
| | 40° C., 80% R.H. | 0.28 | O | 0.30 | O |
| Comp. Ex. 5 | 25° C., 60% R.H. | 0.36 | X | 0.37 | X |
| | 40° C., 80% R.H. | 0.39 | O | 0.41 | X |
| Comp. Ex. 6 | 25° C., 60% R.H. | 0.35 | X | 0.39 | X |
| | 40° C., 80% R.H. | 0.42 | X | 0.43 | X |
| Comp. Ex. 7 | 25° C., 60% R.H. | 0.38 | X | 0.39 | X |
| | 40° C., 80% R.H. | 0.43 | X | 0.42 | X |

As will be apparent from the results of Tables 5 and 6, when the amine salts of the perfluoropolyethers are used, very good results are obtained with respect to the coefficient of friction and the stick-slip under different conditions.

Preparation of Amine Salts of Partially Hydrogenated Perfluoropolyethers 20 g of a partially hydrogenated perfluoropolyether of the formula having a carboxyl group at one end, [F(CF$_2$CF$_2$CF$_2$O)$_a$(CFHCF$_2$CF$_2$O)$_b$(CF$_2$CF$_2$CF$_2$O)$_c$CF$_2$CF$_2$COOH] (molecular weight: 3500) was placed in a round bottom flask, to which 1.6 g of octadecylamine was added.

Subsequently, the mixture was heated to 60° C. and sufficiently agitated to make it uniform, followed by cooling to obtain an amine salt of the partially hydrogenated perfluoropolyether.

The above procedure was repeated using different types of amines and a different degree of the hydrogenation thereby obtaining amine salts of the partially hydrogenated perfluoropolyethers as shown in Table 7.

TABLE 7

| Product No. | Rate of Hydrogenation | R$^1$ | R$^2$ | R$^3$ | R$^4$ |
|---|---|---|---|---|---|
| 15 | 40% | H | H | H | C$_{18}$H$_{37}$ |
| 16 | 40% | H | H | H | C$_{16}$H$_{33}$ |
| 17 | 40% | H | H | H | C$_{14}$H$_{29}$ |
| 18 | 40% | H | H | H | C$_{12}$H$_{25}$ |
| 19 | 40% | H | H | CH$_3$ | C$_{12}$H$_{25}$ |
| 20 | 40% | H | CH$_3$ | CH$_3$ | C$_{12}$H$_{25}$ |
| 21 | 40% | CH$_3$ | CH$_3$ | CH$_3$ | C$_{12}$H$_{25}$ |
| 22 | 30% | H | H | H | C$_6$H$_5$ (phenyl) |
| 23 | 30% | H | H | H | C$_{18}$H$_{37}$ |
| 24 | 30% | H | H | H | C$_{12}$H$_{25}$ |
| 25 | 30% | H | CH$_3$ | CH$_3$ | C$_{16}$H$_{32}$ |
| 26 | 30% | CH$_3$ | CH$_3$ | CH$_3$ | C$_{18}$H$_{37}$ |
| 27 | 30% | H | H | H | CH$_2$=CHC$_{16}$H$_{32}$ |
| 28 | 30% | H | H | H | iso-C$_{16}$H$_{32}$ |

EXAMPLES 29 TO 42

Co was deposited on a 14 μm thick polyethylene terephthalate by an oblique vacuum deposition method to form a 200 nm thick ferromagnetic metal thin film thereon. A solution of each of Product Nos. 15 to 28 in a mixed solvent of Freon and ethanol was applied onto the surface of the metal magnetic thin film in an amount of 5 mg/m$^2$, followed by cutting into 8 mm wide sample tapes.

The respective sample tapes were subjected to measurements of a coefficient of friction, still reproduction durability and shuttle durability under conditions of a temperature of 25° C. and a relative humidity of 60%, a temperature of –5° C., and a temperature of 40° C. and a relative humidity of 80%. For comparison, partially hydrogenated perfluoropolyethers having rates of hydrogenation of 40% and 30 as used in the above examples were singly used as a lubricant, followed by similar measurements. The results are shown in Tables 8 to 10.

TABLE 8

| | Conditions | Coefficient Of Friction | Still Reproduction Durability (minutes) | Shuttle Durability (Cycles) |
|---|---|---|---|---|
| Ex. 29 | 25° C., 60% R.H. | 0.15 | >120 | >150 |
| | 40° C., 80% R.H. | 0.20 | >120 | >150 |
| | –5° C. | 0.16 | >120 | >150 |
| Ex. 30 | 25° C., 60% R.H. | 0.16 | >120 | >150 |

TABLE 8-continued

| | Conditions | Coefficient Of Friction | Still Reproduction Durability (minutes) | Shuttle Durability (Cycles) |
|---|---|---|---|---|
| | 40° C., 80% R.H. | 0.21 | >120 | >150 |
| | –5° C. | 0.17 | >120 | >150 |
| Ex. 31 | 25° C., 60% R.H. | 0.17 | >120 | >150 |
| | 40° C., 80% R.H. | 0.19 | >120 | >150 |
| | –5° C. | 0.16 | >120 | >150 |
| Ex. 32 | 25° C., 60% R.H. | 0.15 | >120 | >150 |
| | 40° C., 80% R.H. | 0.20 | >120 | >150 |
| | –5° C. | 0.17 | >120 | >150 |
| Ex. 33 | 25° C., 60% R.H. | 0.17 | >120 | >150 |
| | 40° C., 80% R.H. | 0.19 | >120 | >150 |
| | –5° C. | 0.17 | >120 | >150 |
| Ex. 34 | 25° C., 60% R.H. | 0.17 | >120 | >150 |
| | 40° C., 80% R.H. | 0.20 | >120 | >150 |
| | –5° C. | 0.18 | >120 | >150 |

TABLE 9

| | Conditions | Coefficient Of Friction | Still Reproduction Durability (minutes) | Shuttle Durability (Cycles) |
|---|---|---|---|---|
| Ex. 35 | 25° C., 60% R.H. | 0.18 | >120 | >150 |
| | 40° C., 80% R.H. | 0.20 | >120 | >150 |
| | –5° C. | 0.18 | >120 | >150 |
| Ex. 36 | 25° C., 60% R.H. | 0.18 | >120 | >150 |
| | 40° C., 80% R.H. | 0.22 | >120 | >150 |
| | –5° C. | 0.20 | >120 | >150 |
| Ex. 37 | 25° C., 60% R.H. | 0.15 | >120 | >150 |
| | 40° C., 80% R.H. | 0.19 | >120 | >150 |
| | –5° C. | 0.17 | >120 | >150 |
| Ex. 38 | 25° C., 60% R.H. | 0.16 | >120 | >150 |
| | 40° C., 80% R.H. | 0.19 | >120 | >150 |
| | –5° C. | 0.17 | >120 | >150 |
| Ex. 39 | 25° C., 60% R.H. | 0.17 | >120 | >150 |
| | 40° C., 80% R.H. | 0.19 | >120 | >150 |
| | –5° C. | 0.16 | >120 | >150 |
| Ex. 40 | 25° C., 60% R.H. | 0.17 | >120 | >150 |
| | 40° C., 80% R.H. | 0.20 | >120 | >150 |
| | –5° C. | 0.18 | >120 | >150 |

TABLE 10

| | Conditions | Coefficient Of Friction | Still Reproduction Durability (minutes) | Shuttle Durability (Cycles) |
|---|---|---|---|---|
| Ex. 41 | 25° C., 60% R.H. | 0.15 | >120 | >150 |
| | 40° C., 80% R.H. | 0.18 | >120 | >150 |
| | –5° C. | 0.17 | >120 | >150 |
| Ex. 42 | 25° C., 60% R.H. | 0.17 | >120 | >150 |
| | 40° C., 80% R.H. | 0.20 | >120 | >150 |
| | –5° C. | 0.19 | >120 | >150 |
| Comp. Ex. 8 | 25° C., 60% R.H. | 0.9 | 2 | 3 |
| | 40° C., 80% R.H. | — | — | — |
| | –5° C. | — | — | — |
| Comp. Ex. 9 | 25° C., 60% R.H. | 0.20 | >120 | >150 |
| | 40° C., 80% R.H. | 0.24 | 91 | 55 |
| | –5° C. | 0.21 | 51 | 60 |
| Comp. Ex. 10 | 25° C., 60% R.H. | 0.21 | 95 | 120 |
| | 40° C., 80% R.H. | 0.23 | 76 | 46 |
| | –5° C. | 0.22 | 29 | 40 |
| Comp. Ex. 11 | 25° C., 60% R.H. | 0.31 | 100 | 89 |
| | 40° C., 80% R.H. | 0.42 | 82 | 40 |
| | –5° C. | 0.30 | 45 | 55 |

As will be apparent from Tables 8 to 10, the amine salts of the partially hydrogenated perfluoropolyethers are better than the partially hydrogenated perfluoropolyethers used singly with respect to the coefficient of friction, the still reproduction durability and the shuttle durability without degradation under various conditions.

EXAMPLE 43

This example Illustrates mixing of a perfluoropolyether terminated with a carboxyl group and an alkylamine for use as a lubricant while varying the amount of the alkylamine.

In order to check the effect of the alkylamine in different amounts of addition, there were used lubricants having a perfluoropolyether mixed with the alkylamine at different weight ratios to the polyether of from 1/9 to 10/1, the perfluoropolyether alone (the above molar ratio being zero), and the alkylamine alone (the above molar ratio being infinite). The perfluoropolyether used had the following formula, $F(CF_2CF_2CF_2O)_mCF_2CF_2COOH$, and the alkylamine used was of the formula, $C_{18}H_{37}NH_2$.

Co was deposited on a 14 μm thick polyethylene terephthalate by an oblique vacuum deposition method to form a 200 nm thick ferromagnetic thin film. The lubricants having different molar ratios, the perfluoropolyether and the alkylamine which were dissolved in Freon were each applied onto the thin film surface in an amount of 5 mg/m², followed by cutting into 8 mm wide sample tapes.

These tapes were subjected to measurements of a coefficient of friction under conditions of a temperature of 25° C. and a relative humidity of 60% and a temperature of 40° C. and a relative humidity of 80% after passing through a stainless cylinder 100 times. The results are shown in Table 11.

TABLE 11

| Sample No. | Stearylamine/ Perfluoropolyether (by mole) | Coefficient of Friction 25° C. 60% R.H./40° C. 80% R.H. |
|---|---|---|
| 1 | 0 | 0.23/0.30 |
| 2 | 1/9 | 0.23/0.29 |
| 3 | 1/4 | 0.22/0.29 |
| 4 | 3/7 | 0.28/0.26 |
| 5 | 2/3 | 0.15/0.19 |
| 6 | 1/1 | 0.15/0.21 |
| 7 | 3/2 | 0.16/0.21 |
| 8 | 7/3 | 0.15/0.19 |
| 9 | 4/1 | 0.16/0.19 |
| 10 | 9/1 | 0.16/0.21 |
| 11 | 40/1 | 0.17/0.23 |
| 12 | ∞ | 0.25/0.28 |

As will be apparent from the results of Table 11, when lubricants formulated with the perfluoropolyether and the alkylamine at a molar ratio of from 3/7 to 40/1 are used, the coefficient of friction is not degraded under different conditions, with very good results.

EXAMPLE 44

The general procedure of Example 43 was repeated except that the perfluoropolyether used had the following formula, $[HOOC(CF_2O)_d(CF_2CF_2O)_eCF_2COOH]$ which have a carboxyl group at both ends and that the molar ratio was changed to a ratio between the amino group and the carboxyl group.

The results are shown in Table 12.

TABLE 12

| Sample No. | Stearylamine/ Perfluoropolyether (by mole) | Coefficient of Friction 25° C. 60% R.H./40° C. 80% R.H. |
|---|---|---|
| 13 | 0 | 0.24/0.32 |
| 14 | 1/9 | 0.23/0.31 |
| 15 | 1/5 | 0.22/0.30 |
| 16 | 3/7 | 0.18/0.25 |
| 17 | 2/3 | 0.17/0.23 |
| 18 | 1/1 | 0.16/0.21 |
| 19 | 3/2 | 0.16/0.21 |
| 20 | 7/3 | 0.16/0.19 |
| 21 | 4/1 | 0.16/0.21 |
| 22 | 9/1 | 0.17/0.21 |
| 23 | 40/1 | 0.18/0.22 |
| 24 | ∞ | 0.25/0.28 |

The results of the above table reveal that a similar tendency is attained when using the perfluoropolyether having a carboxyl group at both ends.

In Examples 43 and 44, amines other than the stearylamine were not used. However, amines having linear, branched and alicyclic hydrocarbon groups or aromatic hydrocarbon groups are assumed to exhibit similar effects. The above is true of other perfluoropolyethers having a carboxyl group at one or both ends.

Preparation of Diamine Salts of Perfluoropolyether Having a Carboxyl Group at Both Ends 20 g of a perfluoropolyether of the following formula having a carboxyl group at both ends, $HOOC(CF_2O)_d(CF_2CF_2O)_eCF_2COOH$ (Z-DIAC, available from Monte Fluoro Co., Ltd.)(molecular weight: 2000) was placed in a round bottom flask, to which 5.4 g of octadecylamine was added.

Subsequently, the mixture was heated to 60° C. and sufficiently agitated to make a uniform solution, followed by cooling to obtain an amine salt of the perfluoropolyether having the carboxyl group at both ends.

The above procedure was repeated using different diamines. The amine salts obtained are indicated in Table 13.

TABLE 13

| Product No. | R | $R^5$–$R^7$ |
|---|---|---|
| 29 | $(CH_2)_4$ | H |
| 30 | $(CH_2)_6$ | H |
| 31 | $(CH_2)_8$ | H |
| 32 | $(CH_2)_{10}$ | H |
| 33 | $(CH_2)_{12}$ | H |
| 34 | $CH_2C_6H_4CH$ | H |
| 35 | $CH_2C_{10}H_6CH_2$ | H |
| 36 | $C_6H_4$ | H |
| 37 | $C_4H_4$ (pyrazine) | H |

EXAMPLES 45 TO 54

Co was deposited on a 14 μm thick polyethylene terephthalate by an oblique vacuum deposition method to form a 200 nm thick ferromagnetic metal thin film thereon. A solution of each of Product Nos. 29 to 37 in Table 13 in Freon was applied onto the surface of the metal magnetic thin film in an amount of 5 mg/m², followed by cutting into 8 mm wide sample tapes.

The respective sample tapes were subjected to measurements of a coefficient of friction, still reproduction durability and shuttle durability under conditions of a temperature of 25° C. and a relative humidity of 60%, a temperature of −5° C., and a temperature of 40° C. and a relative humidity of 80%. For comparison, the perfluoropolyether having a carboxyl group at both ends (having the same structure as used in Preparation but not reacted with any amine) was used to obtain a sample tape, followed by similar measurements. The results are shown in Tables 14 and 15.

TABLE 14

| | Conditions | Coefficient Of Friction | Still Reproduction Durability (minutes) | Shuttle Durability (Cycles) |
|---|---|---|---|---|
| Ex. 45 | 25° C., 60% R.H. | 0.22 | >120 | >150 |
| | 40° C., 80% R.H. | 0.25 | >120 | >150 |
| | −5° C. | 0.22 | >120 | >150 |
| Ex. 46 | 25° C., 60% R.H. | 0.21 | >120 | >150 |
| | 40° C., 80% R.H. | 0.24 | >120 | >150 |
| | −5° C. | 0.22 | >120 | >150 |
| Ex. 47 | 25° C., 60% R.H. | 0.21 | >120 | >150 |
| | 40° C., 80% R.H. | 0.24 | >120 | >150 |
| | −5° C. | 0.21 | >120 | >150 |
| Ex. 48 | 25° C., 60% R.H. | 0.21 | >120 | >150 |
| | 40° C., 80% R.H. | 0.23 | >120 | >150 |
| | −5° C. | 0.21 | >120 | >150 |
| Ex. 49 | 25° C., 60% R.H. | 0.20 | >120 | >150 |
| | 40° C., 80% R.H. | 0.23 | >120 | >150 |
| | −5° C. | 0.21 | >120 | >150 |

TABLE 15

| | Conditions | Coefficient Of Friction | Still Reproduction Durability (minutes) | Shuttle Durability (Cycles) |
|---|---|---|---|---|
| Ex. 50 | 25° C., 60% R.H. | 0.22 | >120 | >150 |
| | 40° C., 80% R.H. | 0.26 | >120 | >150 |
| | −5° C. | 0.23 | >120 | >150 |
| Ex. 51 | 25° C., 60% R.H. | 0.22 | >120 | >150 |
| | 40° C., 80% R.H. | 0.25 | >120 | >150 |
| | −5° C. | 0.23 | >120 | >150 |
| Ex. 52 | 25° C., 60% R.H. | 0.21 | >120 | >150 |
| | 40° C., 80% R.H. | 0.25 | >120 | >150 |
| | −5° C. | 0.22 | >120 | >150 |
| Ex. 53 | 25° C., 60% R.H. | 0.22 | >120 | >150 |
| | 40° C., 80% R.H. | 0.23 | >120 | >150 |
| | −5° C. | 0.21 | >120 | >150 |
| Comp. Ex. 12 | 25° C., 60% R.H. | 0.31 | 100 | 89 |
| | 40° C., 80% R.H. | 0.42 | 82 | 40 |
| | −5° C. | 0.30 | 45 | 55 |
| Comp. Ex. 13 | 25° C., 60% R.H. | 0.90 | 2 | 3 |
| | 40° C., 80% R.H. | — | — | — |
| | −5° C. | — | — | — |

As will be apparent from the results of Tables 14 and 15, the diamine salts of the perfluoropolyether are better than the perfluoropolyether alone with respect to the coefficient of friction, still reproduction durability and shuttle durability. The lubricity was not degraded under different severe conditions with very good results.

Preparation of Diamine Salts of Perfluoropolyethers Terminated with a Carboxyl Group at One End 20 g of a perfluoropolyether of the following formula having a carboxyl group at one end, [F(CF$_2$CF$_2$CF$_2$O)$_m$CF$_2$CF$_2$COOH] (molecular weight: 1700) was placed in a round bottom flask, to which 0.52 g of 1,4-diaminobutane.

The mixture was heated to 50° C. and sufficiently agitated for uniformity, followed by cooling to obtain a diamine salt of the perfluoropolyether.

The IR absorption spectrum chart of the thus obtained amine salt is shown in FIG. 2. From the figure, it will be seen that the stretching vibration at 3300 cm$^{-1}$ disappears and a broad absorption of the quaternary amine appears at 3050 cm$^{-1}$ and that the absorption of the carbonyl at 1780 cm$^{-1}$ is shifted to 1670 cm$^{-1}$ and there appear the stretching vibration of CH in the vicinity of 2950 cm$^{-1}$ and the stretching vibration of CF in a range of from 1350 cm$^{-1}$ and 1100 cm$^{-1}$. From these facts, the structure of the amine salt can be determined.

The above procedure was repeated using different types of perfluoropolyethers having a carboxyl group at one end and different types of diamines, thereby obtaining diamine salts. These salts are shown in Table 16.

TABLE 16

| Product No. | Perfluoropolyether | $R^5, R^8$ | $R^6, R^9$ | $R^7, R^{10}$ | R |
|---|---|---|---|---|---|
| 38 | F(CF$_2$CF$_2$CF$_2$O)$_m$CF$_2$CF$_2$COOH | H | H | CH$_3$ | (CH$_2$)$_4$ |
| 39 | F(CF$_2$CF$_2$CF$_2$O)$_m$CF$_2$CF$_2$COOH | H | H | H | (CH$_2$)$_6$ |
| 40 | F(CF$_2$CF$_2$CF$_2$O)$_m$CF$_2$CF$_2$COOH | H | H | H | (CH$_2$)$_8$ |
| 41 | F(CF$_2$CF$_2$CF$_2$O)$_m$CF$_2$CF$_2$COOH | H | H | H | (CH$_2$)$_{12}$ |
| 42 | F(CF$_2$CF$_2$CF$_2$O)$_m$CF$_2$CF$_2$COOH | H | H | H | CH$_2$C$_6$H$_4$CH$_2$ |
| 43 | F(CF$_2$CF$_2$CF$_2$O)$_m$CF$_2$CF$_2$COOH | H | H | H | CH$_2$C$_{10}$H$_6$CH$_2$ |
| 44 | F(CF$_2$CF$_2$CF$_2$O)$_m$CF$_2$CF$_2$COOH | CH$_3$ | H | H | (CH$_2$)$_4$ |
| 45 | F(CF$_2$CF$_2$CF$_2$O)$_m$CF$_2$CF$_2$COOH | CH$_3$ | CH$_3$ | H | (CH$_2$)$_4$ |
| 46 | F(CF$_2$CF$_2$CF$_2$O)$_m$CF$_2$CF$_2$COOH | CH$_3$ | CH$_3$ | CH$_3$ | (CH$_2$)$_4$ |

TABLE 16-continued

| Product No. | Perfluoropolyether | $R^5, R^8$ | $R^6, R^9$ | $R^7, R^{10}$ | R |
|---|---|---|---|---|---|
| 47 | $CF_3(OCFCF_2)_j(OCF_2)_kCOOH$ with $CF_3$ branch | H | H | H | $(CH_2)_4$ |
| 48 | $CF_3(OCFCF_2)_j(OCF_2)_kCOOH$ with $CF_3$ branch | H | H | H | $(CH_2)_6$ |
| 49 | $CF_3(OCFCF_2)_j(OCF_2)_kCOOH$ with $CF_3$ branch | H | H | H | $(CH_2)_8$ |
| 50 | $CF_3(OCFCF_2)_j(OCF_2)_kCOOH$ with $CF_3$ branch | H | H | H | $(CH_2)_{12}$ |
| 51 | $CF_3(OCFCF_2)_j(OCF_2)_kCOOH$ with $CF_3$ branch | H | H | H | $CH_2C_6H_4CH_2$ |

EXAMPLES 55 TO 69

Co was deposited on a 14 μm thick polyethylene terephthalate by an oblique vacuum deposition method to form a 200 nm thick ferromagnetic metal thin film thereon. A solution of each of Product Nos. 38 to 51 of Table 16 in a mixture of Freon and ethanol was applied onto the surface of the metal magnetic thin film in an amount of 5 mg/m², followed by cutting into 8 mm wide sample tapes.

The respective sample tapes were subjected to measurements of a coefficient of friction, still reproduction durability and shuttle durability under conditions of a temperature of 25° C. and a relative humidity of 60%, a temperature of –5° C., and a temperature of 40° C. and a relative humidity of 80%. For comparison, the perfluoropolyether having a carboxyl group at one end (having the same structure as used in Preparation but not reacted with any amine) was used to obtain a sample tape, followed by similar measurements. The results are shown in Tables 17 and 19.

TABLE 17

| | Conditions | Coefficient Of Friction | Still Reproduction Durability (minutes) | Shuttle Durability (Cycles) |
|---|---|---|---|---|
| Ex. 54 | 25° C., 60% R.H. | 0.18 | >120 | >150 |
| | 40° C., 80% R.H. | 0.21 | >120 | >150 |
| | –5° C. | 0.18 | >120 | >150 |
| Ex. 55 | 25° C., 60% R.H. | 0.17 | >120 | >150 |
| | 40° C., 80% R.H. | 0.21 | >120 | >150 |
| | –5° C. | 0.18 | >120 | >150 |
| Ex. 56 | 25° C., 60% R.H. | 0.18 | >120 | >150 |
| | 40° C., 80% R.H. | 0.19 | >120 | >150 |
| | –5° C. | 0.17 | >120 | >150 |
| Ex. 57 | 25° C., 60% R.H. | 0.16 | >120 | >150 |
| | 40° C., 80% R.H. | 0.20 | >120 | >150 |
| | –5° C. | 0.17 | >120 | >150 |
| Ex. 58 | 25° C., 60% R.H. | 0.18 | >120 | >150 |
| | 40° C., 80% R.H. | 0.19 | >120 | >150 |
| | –5° C. | 0.18 | >120 | >150 |
| Ex. 59 | 25° C., 60% R.H. | 0.17 | >120 | >150 |
| | 40° C., 80% R.H. | 0.20 | >120 | >150 |
| | –5° C. | 0.18 | >120 | >150 |

TABLE 18

| | Conditions | Coefficient Of Friction | Still Reproduction Durability (minutes) | Shuttle Durability (Cycles) |
|---|---|---|---|---|
| Ex. 60 | 25° C., 60% R.H. | 0.19 | >120 | >150 |
| | 40° C., 80% R.H. | 0.21 | >120 | >150 |
| | –5° C. | 0.19 | >120 | >150 |
| Ex. 61 | 25° C., 60% R.H. | 0.18 | >120 | >150 |
| | 40° C., 80% R.H. | 0.22 | >120 | >150 |
| | –5° C. | 0.21 | >120 | >150 |
| Ex. 62 | 25° C., 60% R.H. | 0.19 | >120 | >150 |
| | 40° C., 80% R.H. | 0.22 | >120 | >150 |
| | –5° C. | 0.18 | >120 | >150 |
| Ex. 63 | 25° C., 60% R.H. | 0.18 | >120 | >150 |
| | 40° C., 80% R.H. | 0.21 | >120 | >150 |
| | –5° C. | 0.19 | >120 | >150 |
| Ex. 64 | 25° C., 60% R.H. | 0.17 | >120 | >150 |
| | 40° C., 80% R.H. | 0.19 | >120 | >150 |
| | –5° C. | 0.18 | >120 | >150 |
| Ex. 65 | 25° C., 60% R.H. | 0.19 | >120 | >150 |
| | 40° C., 80% R.H. | 0.20 | >120 | >150 |
| | –5° C. | 0.18 | >120 | >150 |

TABLE 19

| | Conditions | Coefficient Of Friction | Still Reproduction Durability (minutes) | Shuttle Durability (Cycles) |
|---|---|---|---|---|
| Ex. 66 | 25° C., 60% R.H. | 0.16 | >120 | >150 |
| | 40° C., 80% R.H. | 0.21 | >120 | >150 |
| | –5° C. | 0.18 | >120 | >150 |
| Ex. 67 | 25° C., 60% R.H. | 0.16 | >120 | >150 |
| | 40° C., 80% R.H. | 0.20 | >120 | >150 |
| | –5° C. | 0.19 | >120 | >150 |
| Comp. Ex. 14 | 25° C., 60% R.H. | 0.9 | 2 | 3 |
| | 40° C., 80% R.H. | — | — | — |
| | –5° C. | — | — | — |
| Comp. Ex. 15 | 25° C., 60% R.H. | 0.28 | >120 | >150 |
| | 40° C., 80% R.H. | 0.38 | 91 | 55 |
| | –5° C. | 0.31 | 51 | 60 |
| Comp. Ex. 16 | 25° C., 60% R.H. | 0.31 | 95 | 120 |
| | 40° C., 80% R.H. | 0.43 | 76 | 46 |
| | –5° C. | 0.32 | 29 | 40 |

As will be apparent from the results of Table 17 to 19, the diamine salts of the perfluoropolyethers are better than the perfluoropolyethers alone with respect to the coefficient of friction, the still reproduction durability and the shuttle durability and suffer little degradation under different severe conditions with very good results.

Thus, it will be seen that the novel perfluoropolyether derivatives exhibit better lubricity than known perfluoropolyethers and that they are soluble in not only fluorinated hydrocarbons, but also other organic solvents, thus ensuring utilization of the derivatives in wide fields.

The magnetic recording medium using the perfluoropolyether derivatives as the lubricant can maintain good lubricity under various use conditions over a long term. Accordingly, there can be obtained the magnetic recording medium which has good runnability, wear resistance and durability.

What is claimed is:

1. A perfluoropolyether derivative of the following general formula (4) obtained by reaction between a perfluoropolyether terminated with a carboxyl group at both ends and a diamine

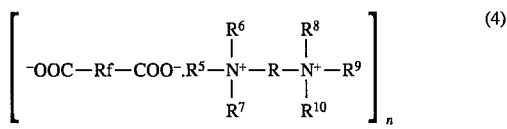

wherein Rf represents a perfluoropolyether chain or a partially hydrogenated perfluoropolyether chain, R represents an alkylene group having from 2 to 18 carbon atoms or an aromatic group, $R^5$, $R^6$, $R^7$, $R^8$, $R^9$ and $R^{10}$ independently represent a hydrogen atom or a hydrocarbon group having from 6 to 22 carbon atoms, and n is an integer of at least one.

2. The derivative according to claim 1, wherein said amine has at least one alkyl group having not less than 10 carbon atoms.

3. The derivative according to claim 1, wherein said derivative has a molecular weight of from 600 to 5000.

4. The derivative according to claim 1, wherein said RF is perfluoropolyether.

5. The derivative according to claim 1, wherein said Rf is partially hydrogenated perfluoropolyether.

6. A lubricant comprising a perfluoropolyether derivative having the formula:

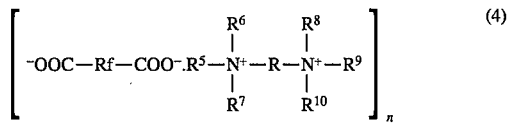

wherein Rf represents a perfluoropolyether chain or a partially hydrogenated perfluoropolyether chain, R represents an alkylene group having from 2 to 18 carbon atoms or an aromatic group, $R^5$, $R^6$, $R^7$, $R^8$, $R^{10}$ independently represent a hydrogen atom or a hydrocarbon group having from 6 to 22 carbon atoms, and n is an integer of at least 1.

7. The lubricant according to claim 6, wherein said RF is perfluoropolyether.

8. The lubricant according to claim 6 wherein said Rf is partially hydrogenated perfluoropolyether.

9. A magnetic recording medium comprising a nonmagnetic support and a magnetic layer formed on said support, said magnetic layer including an internally added perfluoropolyether derivative selected from the group consisting of:

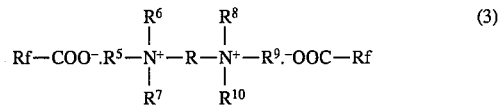

and

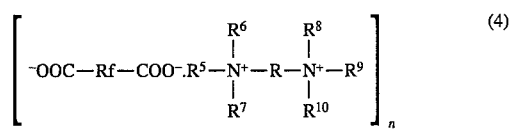

wherein Rf represents a perfluoropolyether chain or a partially hydrogenated perfluoropolyether chain, and R represents an alkylene group having from 2 to 18 carbon atoms or an aromatic group, $R^5$, $R^6$, $R^7$, $R^8$, $R^9$ and $R^{10}$ independently representing a hydrogen atom or a hydrocarbon group having from 6 to 22 carbon atoms and n is an integer of at least 1.

10. A magnetic recording medium according to claim 9 further comprising a back coat layer formed on a side opposite to the magnetic layer, said back coat layer comprising the perfluoropolyether derivative.

11. A magnetic recording medium comprising a nonmagnetic support, a magnetic layer formed on said support, and a lubricant layer formed on said magnetic layer, said lubricant layer comprising at least one perfluoropolyether derivative selected from the group consisting of:

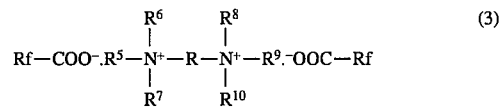

and

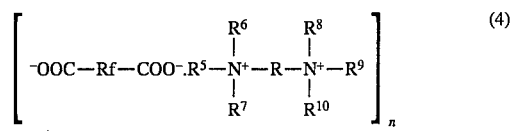

wherein Rf represents a perfluoropolyether chain or a partially hydrogenated perfluoropolyether chain, and R represents an alkylene group having from 2 to 18 carbon atoms or an aromatic group, $R^5$, $R^6$, $R^7$, $R^8$, $R^9$ and $R^{10}$ independently representing a hydrogen atom or a hydrocarbon group having from 6 to 22 carbon atoms and n is an integer of at least 1.

12. A magnetic recording medium according to claim 11 wherein said magnetic layer is made of a ferromagnetic metal.

13. A magnetic recording medium according to claim 11 wherein said at least one perfluoropolyether derivative is present in an amount of from 0.5 to 100 mg/m².

* * * * *